April 11, 1950            E. M. MAY            2,503,447
FOLLOW-UP TYPE POWER AMPLIFIER
Filed March 14, 1946            3 Sheets-Sheet 1
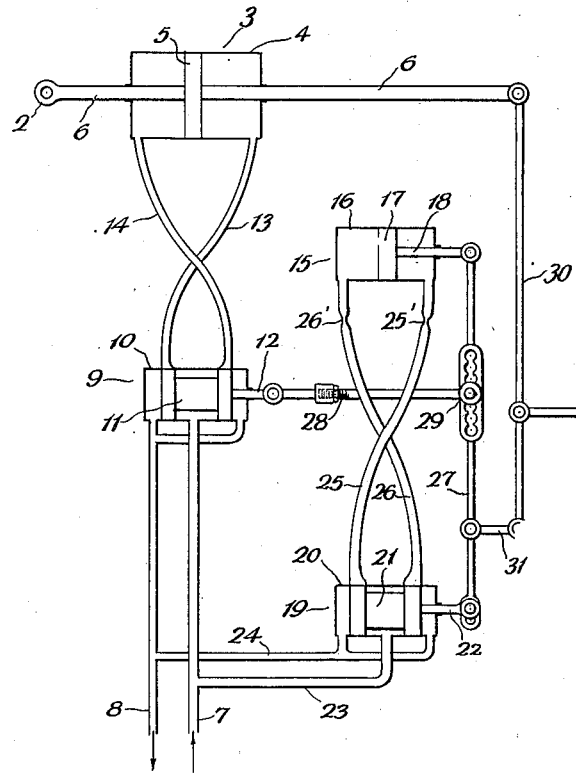
Fig. 1.
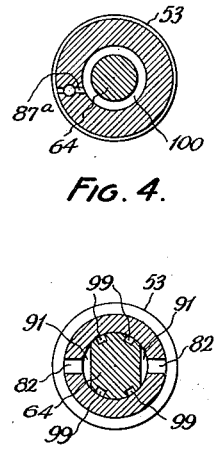
Fig. 4.
Fig. 5.
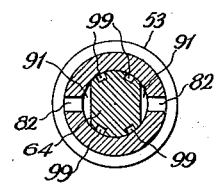
Fig. 6.
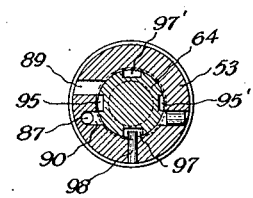
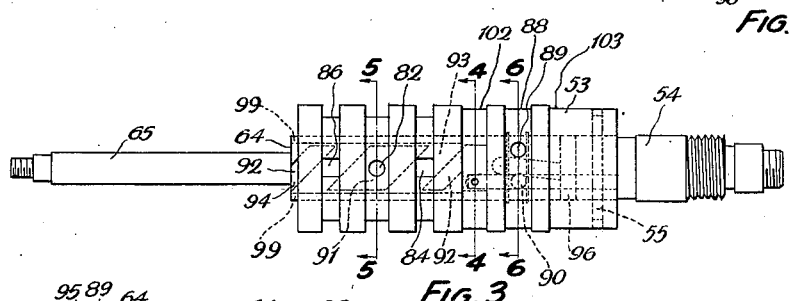
Fig. 3.
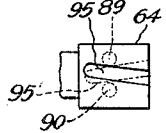
Fig. 7.     Fig. 8.
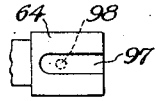
INVENTOR:
Edward M. May
BY Ray S. Gehr
ATTORNEY

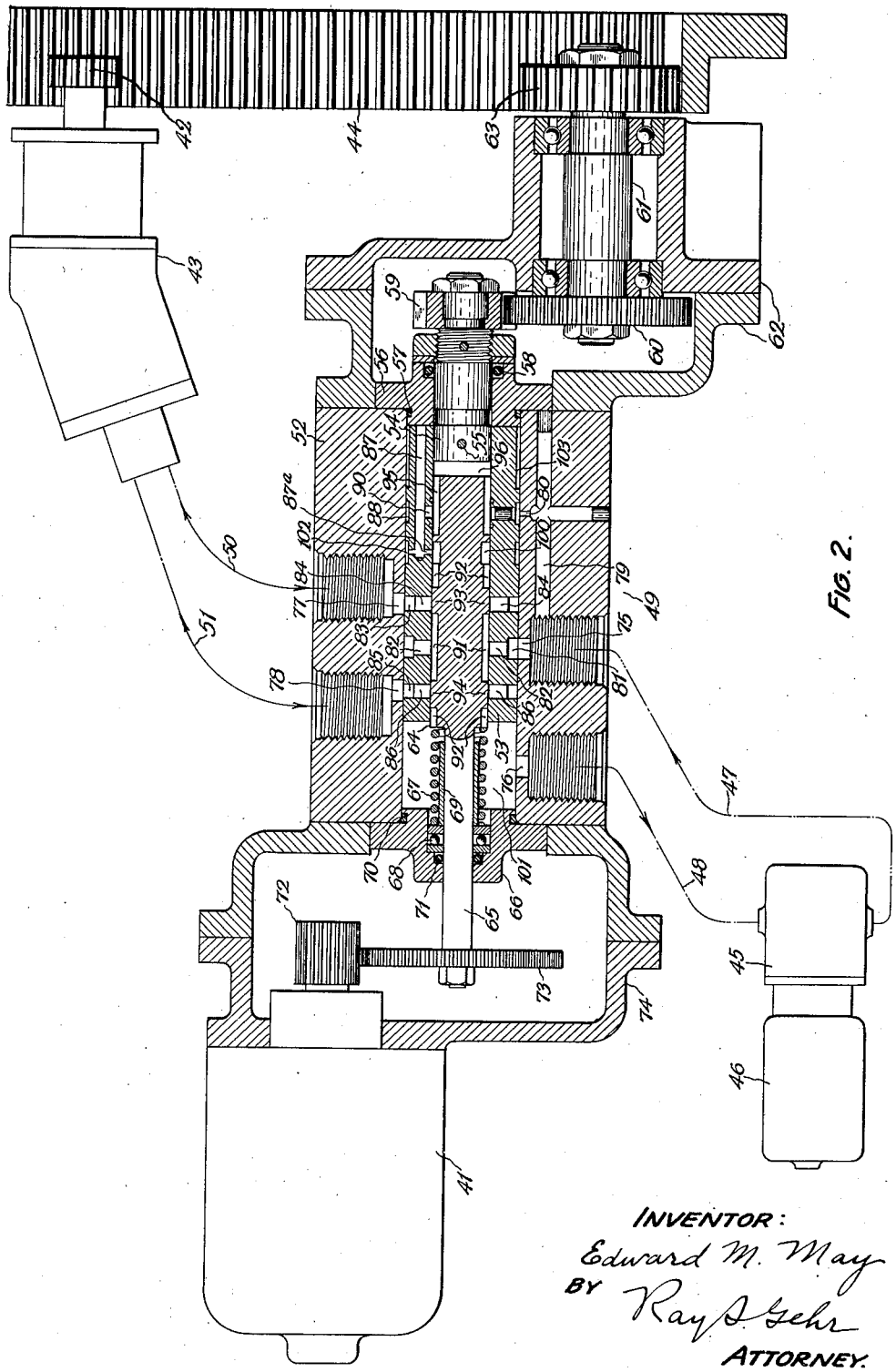

April 11, 1950 E. M. MAY 2,503,447
FOLLOW-UP TYPE POWER AMPLIFIER
Filed March 14, 1946 3 Sheets-Sheet 3

INVENTOR:
Edward M. May
BY Ray J. Gehr
ATTORNEY.

Patented Apr. 11, 1950

2,503,447

UNITED STATES PATENT OFFICE 2,503,447

FOLLOW-UP TYPE POWER AMPLIFIER

Edward M. May, Detroit, Mich.

Application March 14, 1946, Serial No. 654,398

7 Claims. (Cl. 121—41)

1

The invention relates to follow-up type power amplifying apparatus operated by a flowing medium under pressure and of the type in which a power driven output part or device is given a movement proportional to the movement of an input part or device the force and extent of which may be small in relation to the force and extent of the movement of the output device. More particularly the invention has to do with two-stage amplifying apparatus of the character stated.

It is an object of the invention to provide a plural stage power system of the character specified in which rates of acceleration and deceleration of the output member of the system are kept relatively close to the corresponding rates of the input member, even when the inertia of the output member is high, with resultant minimizing of vibration, shock and hunting in the operation of the apparatus.

Another object of the invention is to provide a plural stage power system of the character first specified in which discrepancies in the relative instantaneous velocities of the input and output members of the system are minimized in value during periods of acceleration and deceleration and corresponding reduction of positional errors of the output movement incident to such velocity or speed discrepancies is attained.

It is also an object of the invention to provide a two-stage power system of the character first specified having means for operating both the first stage control means and the second stage control means differentially from the first stage motor and the input means to gain more immediate response of the output to the input than has been realized with prior apparatus.

A further object of the invention is to provide a plural stage power system of the character first specified in which above stated objects are attained without sacrificing, either during periods of acceleration or deceleration or during operation at constant speed, such degree of positional accuracy dependent upon the servomotor controls and follow-up devices as has characterized prior systems.

A further object of the invention is to provide a system of the character in question and having the operational characteristics specified in the above stated objects in which the input and output parts of the mechanism are mounted for straight line reciprocation in the operation of the apparatus.

A further object of the invention is to provide

2 a system of the character in question and having the operating characteristics specified in the above stated objects in which the input and output parts of the mechanism are mounted for rotational movement in the operation of the apparatus.

Still another object of the invention is the provision of such an apparatus of the rotary type last referred to which is characterized by structural simplicity and compactness.

Other objects of the invention more or less incidental or ancillary to those which are stated above will be apparent from the description to follow.

With the stated objects in view the invention consists in certain combinations, forms and arrangements of parts as hereinafter explained in connection with the accompanying drawings and more particularly defined in the appended claims.

In the drawings,

Fig. 1 shows more or less diagrammatically a two-stage amplifying mechanism of the reciprocatory type which embodies the present invention.

Fig. 2 is a sectional elevation, partly diagrammatic, of another embodiment of the invention in which the main parts of the apparatus are mounted for rotational movement.

Fig. 3 is a detailed plan view of two of the main parts of the mechanism shown in section in Fig. 2.

Fig. 4 is a section on the line 4—4 of Fig. 3.

Fig. 5 is a section on the line 5—5 of Fig. 3.

Fig. 6 is a section on the line 6—6 of Fig. 3.

Figs. 7 and 8 are, respectively, a fragmentary plan and a fragmentary side elevation showing a portion of the spindle member of the rotary valve mechanism.

Figure 9:
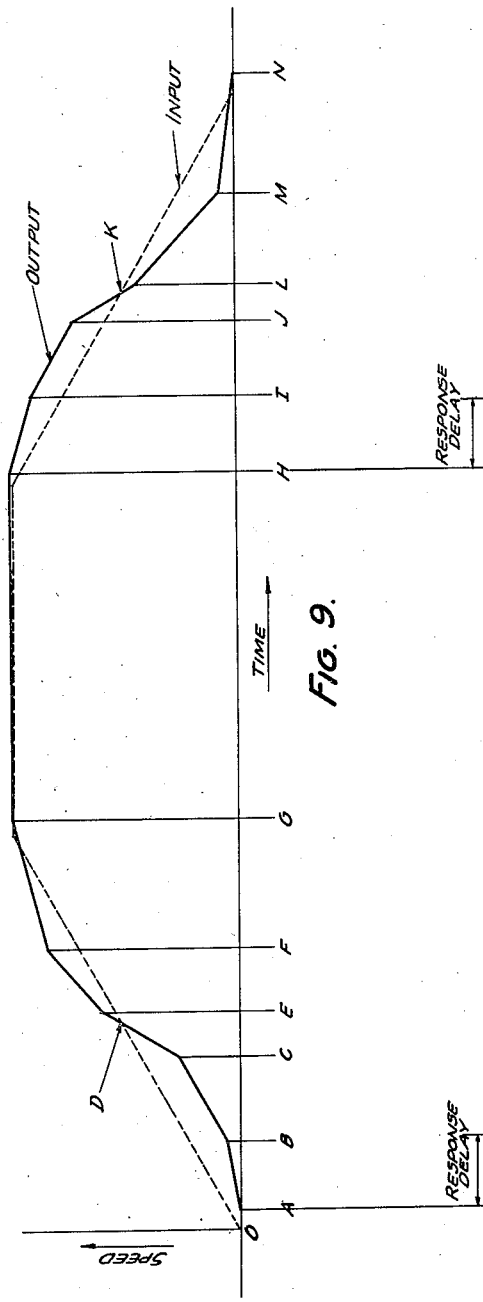
Fig. 9 is a chart presenting a response curve of the improved amplifier comparing output to input with speed plotted against time.

Referring in detail to the construction illustrated in the drawing, the apparatus shown in Fig. 1 makes use of valve and motor devices of the reciprocating type. In this apparatus 1 is a primary input member in the form of a link mounted for endwise movement and operable either manually or by some mechanical means. 2 is the main output member of the apparatus in the form of a coupling designed to be actuated by a motor 3 consisting of a cylinder 4, piston 5 and a piston rod 6 which is connected to coupling part 2. The motor 3 can be actuated by any flowing medium under pressure such as hydraulic liquid which may be supplied by a pump (not shown) having its discharge connected to a conduit 7 and its intake connected to a return conduit 8. The numeral 9 designates as an entirety a spool type valve 11 with actuating rod 12 for controlling admission and discharge of working fluid to the motor 3. With the conduits 7 and 8 connected to cylinder 10 as shown and the latter connected by conduits 13 and 14 to cylinder 4 of the motor 3, the valve is adapted to supply and discharge the power fluid to and from motor 3 in well known manner to effect its reciprocation in either direction.

The valve 9 is actuated chiefly by a servo-motor designated in its entirety by the numeral 15. This motor comprises a cylinder 16, piston 17 and piston rod 18. Motor 15 is in turn actuated by power fluid admitted from the main conduit 7 and discharged to the main return conduit 8 by means of a valve 19 which is of the same character as the valve 9 and comprises a cylinder 20, valve member 21 and valve rod 22. The valve cylinder is connected by conduit 23 with the main supply conduit 7 and by conduit 24 with the main return conduit 8. The valve cylinder 20 is also operatively connected by conduits 25 and 26 with the cylinder 16 of motor 15.

The motor 15 has a driving connection with the valve 9 in the form of a lever 27 and a link 28. Lever 27 is pivotally connected to piston rod 18, to rod 22 of valve 21 and an input link 31 to form a follow-up between motor 15 and valve 19. Link 28, which is adjustable in length, is pivotally connected at one end to the valve rod 12 and at its other end has an adjustable connection 29 with lever 27. A follow-up lever 30 serves to connect the piston rod 6 of motor 3 with the primary input member 1 and at its lower end the lever is also connected by link 31 to lever 27. Thus connected, the follow-up lever 30 serves also as a secondary input and is appropriately so termed because the movement of its lower end and link 31 is not the resultant of the movement of primary input 1 alone but of the combined movements of input 1 and output piston rod 6.

In the operation of the described apparatus, assuming the parts are at rest with the two motors and their valves in the neutral positions shown in Fig. 1, endwise movement of the primary input member 1, let us say to the left, swings the follow-up lever 30 to the left, and this movement is transmitted by secondary input link 31, lever 27 and rod 22 to the valve member 21, causing the latter to admit fluid under pressure through conduit 23 and conduit 25 to motor 15 in a manner to move its piston 17 to the left. However, during the described movement of valve member 21 by lever 27 the movement of the latter is transmitted through link 28 and valve rod 12 to the valve member 11 of valve 9, although the movement of the valve member 11 is less in amount and correspondingly slower than that of valve member 21 which is first to reach full open position. This movement of valve 11 is initiated while power fluid is being admitted through valve 19 to motor 15 to start movement of its piston 17 toward the left. When movement of the motor piston 17 toward the left is initiated the power of motor 15 is applied to move the upper end of lever arm 27. This latter movement and the movement of the lower end of lever 27 by input 1 is applied additively through link 28 to valve member 11 and may move it to full open position for a maximum supply of power fluid to the right end of motor cylinder 4.

With full pressure applied as stated to motor 3 to move its piston toward the left, the mechanism acts to control this piston movement in predetermined relation to the input movement. Assuming the apparatus is designed with some excess of available power and bearing in mind that valves 11 and 21 have been fully opened toward the left, that piston 17 is in corresponding position toward the left and piston 5 moving toward the left, if piston 5 under the full power is moved too rapidly in relation to the input movement, the pivotal connection of the input 1 to lever 30 will become a fulcrum for the latter and piston rod 6 will move the upper end of the lever to the left with resultant movement of its lower end, lever 27 and valve 21 toward the right. Such movement of lever 27 moves valve 11 to a throttling position that allows the movement of motor piston 5 so that its ratio to the movement of input 1 corresponds to the ratio of the arms of lever 30 when it turns about its lower end as fulcrum.

If now the movement of input 1 is stopped the continuing leftward movement of output motor piston 5 causes a still more rapid swinging of levers 30 and 27, such as last described, to move valve 11 to closed position and stop motor 3. This movement of valve 11 is accompanied by movements of valve 21 and motor piston 17 which, because of shifting of the axes on which the levers turn, are complex in nature. Suffice it to say that during the first part of the rightward movement of valve 11, valve 21 is simultaneously moved to closed position and on beyond to a reverse position. This admits pressure fluid through duct 26 to motor 15 to move piston 17 rightward to its original intermediate position. This movement carries the upper end of lever 27 to the right and its lower end to the left about the left end of link 31 as fulcrum; and thus valve 11, which had been partly closed, is moved further to the right and completely closed, while valve 21 is carried leftward from reverse open position to closed position. In a word, valve 9, from the beginning, will have simply opened and closed while valve 21 has opened, closed, reversed and closed again.

Now the system is again static but with input 1 and output piston 5 in new positions to the left after proportional travels determined by the relative lengths of the arms of follow-up lever 30. The foregoing description covers the action of acceleration and deceleration to standstill in a new position of output and input. When input and output are travelling at constant rates of speed, say to the left, second valve 11 must be open to the left and stationary; first motor piston 17 must be displaced left from neutral and stationary while first valve 21 must be in neutral position and stationary and link 31 displaced to the left and stationary. Thus while both parts 1 and 5 are travelling left at constant speed the displacement left of link 31 allows output 5 to lag behind input 1. This slight lag insures stability and prevents hunting. All other elements of the system are in their original positions.

From a consideration of the symmetrical character of motors 3 and 15 and valves 9 and 19 it will be apparent that movement of the input member 1 to the right instead of to the left will cause operation of the apparatus reverse to that above described and of a nature that will be understood without tracing the detailed steps of the operation.

The apparatus will be seen to provide amplification of the input power and movement in two stages. Roughly speaking, the motor 15, valve 19 and their operative connections provide the first steps of the amplification, while motor 3, its control valve 9 and their operative connections, provide its second stage. The lever 27 serves as a follow-up connection between motor 15 and the secondary input member 31 while lever 30 serves a similar function between motor 3 and the primary input member 1.

In prior practice dual stage amplification systems employing the follow-up principle have been characterized by either a direct drive connection between the motor of the first stage and the motor control valve of the second stage, or a direct drive from the input to the first stage control valve. The usefulness of such prior apparatus has been seriously limited by the fact that in the case of rapid accelerations of the input member of the system and also in installations where the output motor is large in order to move a relatively heavy mass, the operations of the system have been marked by severe vibration and hunting. This is due to the serious time lag in the response of the output motor to the movements of the input element of the apparatus. Even in the case of the first stage motor which has as load only the motor control valve of the second stage, a substantial time is required to overcome the inertia of rest of the working fluid, the motor and the control valve driven by it; and in the case of the larger output motor and its relatively heavy load a correspondingly longer time is needed to overcome inertia. Hence, in the prior apparatus, the lag of the output element of the apparatus in relation to the input element becomes serious. As indicated at the outset, it is an object of the present invention to overcome this fault characterizing prior practice; and this is accomplished by the novel differential connection of the valve 9 of the second stage of the motor 15 of the first stage and the valve 19 of the first stage and the secondary input member 31. The connection to valve 9, effected by the link 29 between valve 9 and the lever arm 27, overcomes the above noted lag between the starting of the movement of the output motor 3 and the movement of the input and the control valve 19; for the initial movement of the lever 27 not only provides the initial actuation of the valve 19 to start motor 15 but simultaneously also provides a sufficient movement of control valve 9 to admit fluid to at least some extent to the motor 3 as soon as the power fluid is admitted to the first stage motor 15. Hence by the time the first stage motor starts its movement the inertia of the heavy mass of or connected with the output motor 3 will have been more or less overcome and the lag which has been referred to is largely prevented and smooth acceleration is attained, as previously noted. Similarly, when the input movement is stopped the action of the system as above described causes the gradual throttling and closing movement of valve 11 to be initiated in quick response to the slowing and stopping of the input 1. In other words, the improved mechanism provides sensitive and quickly responsive means which promptly acts to gradually accelerate and decelerate the output motor of the system with resultant operation marked by rapid but smooth response to change of input movement and freedom from vibration or hunting and from shock.

In the last preceding paragraph reference was made to the inertia of the moving parts of the first stage motor 15 and the working fluid serving it on sudden change in velocity of input 1. In some instances this inertia may be sufficient to provide a sufficient time interval after first stage valve 19 begins to open to enable the accompanying partial opening of second stage valve 9 to at least partially overcome the inertia of output motor 3 before motor 15 can become effective to throw full power upon the motor 3, with resultant shock. In other instances it may be desirable to additionally retard the movement of motor piston 17 by providing the conduits 25 and 26 with restricting means as indicated at 25' and 26'.

In the improved system it is desirable that the amount of the movement of the second stage valve 9 corresponding to given movements of the first stage control valve 19 be subject to variation according to the nature of the output load of the apparatus. In the apparatus of Fig. 1 this is provided for by the adjustable coupling 29 between lever 27 and link 28. The greater the mass or speed of the load to be moved by the output motor the lower the connection 29 should be adjusted, with simultaneous adjustment of the length of link 28 to maintain the symmetry of valve 9.

Referring now to Figs 2 to 8, inclusive, showing the invention embodied in apparatus of a rotary type, 41 designates a synchronous electric motor which serves as the input element of the apparatus, while the output element is in the form of a pinion 42 mounted on and driven by the rotary shaft of a hydraulic motor 43 which as shown is of a type commercially well known. The output pinion 42 is arranged, as shown, to drive a ring gear 44 constituting part of the load of motor 43. The motor 43 is designed to be actuated by hydraulic fluid under pressure supplied by a constant pressure pump 45 driven by a suitable electric motor 46. Pump 45 has its discharge and suction ports, respectively, connected by conduits 47 and 48 with power-actuated valve mechanism designated as an entirety by 49 and connected in turn by conduits 50 and 51 with the ports of the hydraulic motor 43. The showing of hydraulic motor 43 and its pinion 42 and of the motor-driven pump 45, 46 is more or less diagrammatic and on a smaller scale than the other parts of the apparatus.

Considering now in detail the construction of the valve mechanism 49 and its operating connections, it is observed that what has been termed the valve mechanism 49 comprises in fact a hydraulic motor device, as will presently more fully appear. The mechanism 49 comprises a block-like casing 52 which is bored out to receive a sleeve structure 53 with a nice rotational fit. At its right end sleeve 53 is tightly closed by shaft 54 secured against rotation relative to the sleeve by pin 55. Shaft 54 is rotatably mounted in a bearing boss 56 detachably secured to casing 52 with an interposed packing 57. A hydraulic packing 58 is interposed between the shaft and the bearing boss. A pinion 59 fast on the shaft 54 meshes with a gear 60 mounted on a countershaft 61 which also carries a gear 63 that meshes with the load gear 44 of the mechanism. Gears 59, 60 and shaft 61 are enclosed in a casing structure 62 secured to the right end of the casing block 52.

A valve and motor spindle 64 is nicely fitted for rotation and reciprocation within the sleeve 53. Spindle 64 carries a shaft extension 65 which has a bearing support in boss 66 detachably secured to casing 52. A coil spring 67 is disposed around shaft 65 with one end engaging the end of spindle 64 and its other end engaging an anti-friction bearing 68 which takes the thrust of the spring when spindle 64 is moved toward the left. A sleeve 69 surrounding shaft 65 serves as a stop to limit the movement toward the left of spindle 64. A suitable hydraulic packing 70 is interposed between the bearing boss 66 and casing 52 and a hydraulic packing 71 is interposed between the said boss and the shaft 65. A pinion 72 fast on the rotor shaft of motor 41 is arranged to mesh with and drive a gear 73 fast on shaft 65, the axial width of pinion 72 being great enough to accommodate the axial movement of gear 73 incident to reciprocation of the valve spindle 64. Pinion 72 and gear 73 are enclosed in a casing 74 which also serves to connect together the frame of motor 41 and valve casing 52.

The casing structure 52 has at its lower side a high pressure inlet port 75 supplied by conduit 47 and a low pressure discharge port 76 which connects with conduit 48. At its upper side casing 52 has ports 77 and 78 which cooperate, respectively, with the conduits 50 and 51. Casing 52 is also formed with a passage 79 which is at all times in communication with the pressure supply conduit 47 and which has a restricted port 80 leading into the bore of casing 52.

The sleeve structure 53 is formed with a circumferential groove 81 which is at all times in communication with the high pressure inlet port 75; and a pair of diametrically opposite passages 82, 82 connect groove 81 at the top and bottom thereof with the bore of the sleeve. Said sleeve is also formed with a circumferential groove 83 which is at all times in communication with the casing port 77; and this groove 83 communicates at top and bottom through passages 84, 84 with the bore of the sleeve. Similarly sleeve 53 is formed with a circumferential groove 85 registering at all times with the casing port 78 and having communication at top and bottom through passages 86, 86 with the bore of the sleeve. As shown in Fig. 3, the passages 84 and 86 are square in cross-section. At its right end sleeve 53 is formed with a longitudinal passage 87 extending from the end of the sleeve to a passage 87a which communicates at its inner end with the bore of the sleeve. To the right of passage 87a sleeve 53 is formed with a circumferential groove 88 which communicates at the bottom with port 80. In vertical alignment with the groove 88 the sleeve at its upper side is formed with a passage 89 leading from groove 88 inward to the bore of the sleeve and also with a parallel passage 90 leading from the longitudinal passage 87 inward to the bore of the sleeve (Fig. 6).

For cooperation with the various ports of the sleeve structure 53 the spindle 64 is formed as follows. In transverse alignment with the high pressure inlet ports 82 spindle 64 is locally flattened on its top and bottom sides to form diagonally extending transverse grooves 91, 91. Similarly to the right of the sleeve ports 84, 84 and to the left of sleeve ports 86, 86 spindle 64 is formed at top and bottom sides with diagonally extending grooves 92, 92. In the construction shown the grooves 91 and 92 are disposed at an angle of 45° to a vertical plane through the spindle axis (Fig. 3). The formation of the grooves 91 and 92 leaves at the top and bottom of spindle 64 diagonally extending valve ridges 93, 93 disposed to cooperate with the square passages 84, 84 of sleeve 53; and, similarly, diagonal valve ridges 94, 94 disposed to cooperate with the square sleeve passages 86, 86 (Figs. 2 and 3).

From an inspection of Fig. 3 it will be apparent that rotation in either direction of the spindle 64 in relation to the sleeve 53 will open one of the conduits 50, 51 to the high pressure conduit 47 and the other to the suction conduit 48 of pump 45, so that the said relative rotation of the spindle in one direction will start operation of output motor 43 in one direction and such rotation in the other direction will start operation of said motor in the opposite direction.

Referring further to the construction of spindle 64, near its right end it is formed on its top side, as viewed in Fig. 2, with a groove 95 of a width substantially equal to the distance between the passages 89 and 90 (Fig. 6) and having a small spiral inclination with respect to the axis of the spindle. This groove at its left end is closed and at its right end opens into a space between the adjacent end of the spindle and the end of shaft 54. With the shaft and sleeve serving as a cylinder having working space 96 (Fig. 2), the end of the spindle acts as a piston therein and can be moved to the left by pressure fluid admitted through spiral groove 95 when the latter is turned to register with passage 89 and to the right by spring 67 when the spiral groove registers with passage 90. For use alternatively with groove 95 the spindle 64 is formed diametrically opposite groove 95 with a second spiral groove 95' like groove 95 except that the angle of its spiral is different (larger). To position one or the other of the grooves 95, 95' in working relation with passages 89 and 90 the spindle 64 is formed with diametrically opposite slots 97, 97' which can serve alternatively to engage a pin 98 pressed into sleeve 53. This pin and slot construction provides for a limited relative rotation of the spindle and sleeve.

It may now be observed that the spiral groove 95 (or 95'), high pressure passage 89 and low pressure passage 90 serve, by relative rotation of the spindle 64 and sleeve 53, as a valve capable of admitting fluid under pressure to the motor chamber 96 and of discharging it therefrom. Also, admission or discharge of motor fluid from the motor chamber 96 serves in conjunction with spring 67 to move spindle 64 axially in sleeve 53, such axial movement tending by virtue of the spiral form of the groove 95 to restore the closed position thereof in relation to the passages 89 and 90. Furthermore, it will be observed from Fig. 3 that endwise movement of spindle 64 serves to move valve ridges 93 and 94 in relation to the valve ports or passages 84 and 86 with an effect similar to the previously described relative rotation of spindle 64 and sleeve 53, but differing therefrom in that the opening and closing of passages 84 and 86 by the reciprocation of spindle 64 are retarded because of the restriction of passages 80 and 87a. In other words, the main valves controlling admission and discharge of working fluid to and from the output motor 43 are subject to operation by either relative rotation or relative reciprocation of the spindle and sleeve or by both movements combined.

The spindle 64 is formed on its outer surface with four longitudinal grooves 99, 99 (Figs. 3 and 5) which extend from the left end of spindle 64 to a circumferential groove 100 of the spindle disposed just to the left of its spiral grooves 95, 95'. The grooves 99 serve to connect the circumferential groove 100 with the low pressure space 101 to the left of spindle 64 so that passage 90 is at all times in open communication through passages 87, 87a with the said low pressure space. Since passage 87 leads to the end surface of sleeve 53 the building up of undue pressure between that surface and the bearing boss 56 is prevented.

The longitudinal grooves 99, 99 also help to prevent the building up of unbalanced lateral pressures on the spindle with resultant frictional locking action between the spindle and sleeve structures. A similar function with respect to the engagement between the outer surface of the sleeve structure 53 and the bore of the casing 52 is performed by the circumferential grooves 83, 85. To secure a similar effect for the right hand portion of sleeve 53 the latter is circumferentially relieved at 102, 103.

In the use of the rotary type apparatus, just as in the case of the reciprocating type first described, it is desirable that the movement of the output element (pinion 42) reproduce the movement of the input element (motor 41) with amplification of the power and/or movement of the input element. The operation of the device, to this end, is as follows. Assuming that the apparatus is initially at rest starting of the input motor, for example in counter-clockwise direction viewing its rotor from the right in Fig. 2, will cause momentary rotation of the spindle 64 in relation to the sleeve 53 with the result that high pressure fluid is admitted through passages 79 and 80, circumferential groove 88, passage 89 and groove 95 to the motor space 96. The fluid pressure thus admitted to space 96 moves spindle 64 to the left (Fig. 2) until passage 89 is again brought out of register with groove 95 because of the spiral form of the latter. The endwise movement of spindle 64, which is retarded somewhat by the restriction of passage 80, serves to move the valve ridges 93, 94 in an axial direction in relation to the square ports 84 and 86. From an inspection of Figs. 2 and 3 it will be seen that this movement of the valve ridges serves (by movement of ridge 94) to place high pressure inlet port 75 of the valve casing 52 in communication with its outlet port 78 so as to admit high pressure fluid to the output motor 43 and at the same time (by movement of valve ridge 93) to place port 77 of valve casing 52 in communication with the port 76 of the valve casing so that the discharge of low pressure fluid from motor 43 is conveyed through conduit 50, valve casing 52 and conduit 48 back to the suction side of pump 45. However, the initial rotation of valve spindle 64 in relation to the sleeve 53, as will be noted from Fig. 3, also served to effect the same kind of communication for the high pressure fluid from the pump to the output motor 43 and from said motor back again to the pump, this latter valve action incident to relative rotation of the spindle 64 and sleeve 53 occurring somewhat earlier than the valve action incident to the axial movement of the spindle 64 because of the above-noted retardation of the latter movement due to the restriction of passage 80.

The initial rotation of spindle 64 in relation to sleeve 53 was termed "momentary." It is limited to a brief interval of time because the establishment of communication between the pump and output motor starts rotation of the latter which is transmitted through the follow-up connections, comprising gear 44 and counter-shaft 61, back to sleeve 53. Consequently, the movement of the input element of the apparatus is reproduced in the movement of the output element with either positive or negative amplification, according to the follow-up ratios employed, and the relative rotation of spindle 64 and sleeve 53 is small in amount, though ample for the performance of the two valve functions which have been described.

Thus it is seen that spindle 64 is a fluid-pressure-driven piston capable of sliding axially in sleeve 53 so that the two, together with shaft 54 serving as cylinder head, constitute a first stage motor with cylinder working space 96 and equivalent to motor 15 of Fig. 1. Also, groove 95 of spindle 64 and passages 89 and 90 in sleeve 53 cooperate to form a first stage control device corresponding to control 19 of Fig. 1. In addition, groove 95 is spiral in form (Figs. 3, 7), so that the axial travel of spindle 64 is proportional to the circumferential displacement or spiral pitch of groove 95 relative to passages 89 and 90. These three groove and passage parts thus constitute follow-up means equivalent to lever 27 of Fig. 1 and constitute a first stage of amplification.

The two high pressure grooves 91 and four low pressure grooves 92 of spindle 64 cooperate with the passages 84 and 86 in sleeve 53 and form a second stage control device corresponding to valve 9 of Fig. 1. This second stage control device is operatively connected to the second stage motor 43 corresponding to motor 3 of Fig. 1.

The train of gearing 42, 44, 63, 60, 59, 54 from output motor 43 back to sleeve 53 completes a follow-up corresponding to lever 30 in Fig. 1. The result of this follow-up between the output motor 43 and the primary input motor 41 is the rotational displacement between spindle 64 and sleeve 53 equivalent to the linear displacement of secondary input link 31 in Fig. 1. Thus it is seen spindle 64 and sleeve 53 provide secondary input means in the same manner that the two arms of lever 30 in Fig. 1 do so, the outer cylindrical surface part of spindle 64 corresponding to the lower end of lever 30 in Fig. 1 while the inner cylindrical surface part of sleeve 53 corresponds to the upper end of said lever 30.

Now the grooves 91, 92 (Fig. 3) are diagonal and respond to both axial and rotational displacement of spindle 64 relative to sleeve 53. So the second stage valve (grooves 91, 92) and the first stage valve (groove 95) are operated differentially between the first stage axial displacement motor (53—54, 64) and the secondary (rotational) input constituted by spindle 64 and sleeve 53 in the manner above noted.

When the apparatus, including parts 64 and 53, is running at constant speed the secondary input rotational displacement of spindle 64 appears as a lag between output and input and sleeve 53 will be slightly behind spindle 64. In practice this lag can be as low as 1 mil or 3½ minutes of arc, measured on the ring gear 44.

Referring further to the operation of the rotary mechanism, it will be apparent that when the input motor 41 is started from rest there will first be a brief period of acceleration of the first and second stages of the apparatus. Then, when constant speed has been attained by the input motor the speed of the output motor 43 will be adjusted to a corresponding constant speed by adjustment of the rotary second stage valve through the follow-up connections between motor 43 and valve sleeve 53 according to the load on said motor. This action, it will be seen, corresponds to the throttling action of the valve 9 of the Fig. 1 apparatus which was referred to in the foregoing description of the latter.

Following operation of the apparatus at constant speed as last referred to, if the input motor 41 is stopped there will be a brief period of deceleration. This deceleration will first appear in the input motor and the valve spindle 64, with resultant momentary overrunning of the motor 43 and sleeve 53 causing relative rotation of the spindle 64 in relation to the sleeve 53 in a direction opposite to that which occurred during the period of acceleration of the mechanism. This last relative rotation obviously will simultaneously affect both the spiral groove valve of the first stage and the rotary valve of the second stage, both actions tending to close the rotary valve ports. More specifically, the reverse rotation of the spiral groove 95 will act to cut off said groove from high pressure passage 89 and open it to low pressure port 90 (Figs. 3 and 6). In this way the first stage motor space 96 is opened to exhaust permitting movement of spindle 64 by spring 67 toward the initial position of the spindle shown in Fig. 2 with the effect of restoring the spiral groove 95 to the closed position shown in Fig. 6 of the drawing. This axial movement of spindle 64 has a direct closing effect on the rotary valve of the second stage. However, this axial movement of spindle 64 is retarded by the restricted size of exhaust passage 87a so that the closing effect of the said axial movement on the rotary valve of the second stage is somewhat preceded by the more rapid rotational closing movement of the said valve incident to the relative rotation of the spindle 64 and sleeve 53. Thus, it will be seen, the operation of the rotary mechanism incident to deceleration and stopping corresponds closely to that of the first described reciprocating mechanism.

The coupling 29 is adjustable for the purposes which have been pointed out in connection with the Fig. 1 apparatus. Similarly in the rotary apparatus the angle of the spiral groove can be adjusted or modified by selecting either of the grooves 95 and 95' with their different spiral angles.

Again, the rotary apparatus possesses the same capacity for operation in either clockwise or counter-clockwise rotation of the input and output motors by reason of the symmetrical character of both the first stage and second stage valves of the mechanism. This will be apparent from an inspection of Figs. 2 and 3. Thus if the input motor is rotated clockwise, instead of counter-clockwise as assumed for the above description, the rotation of the spindle 64 in relation to the sleeve 53 will be in a counter-clockwise direction in Fig. 6 of the drawing so that spiral groove 95 will be opened to the low pressure passage 90 permitting exhaust from the working chamber 96 with resultant axial movement by spring 67 of spindle 64 toward the right, as viewed in Fig. 2. This movement will cause inlet port 75 of the valve casing 52 to be placed in communication with outlet port 77 while port 78 will be placed in communication with low pressure space 101 and outlet port 76 of the valve casing to cause rotation of output motor 43 in the direction opposite that of its previous operation, to correspond with the reversal of the input motor; and, as with the previously described operation, the relative rotation of the spindle 64 and sleeve 53 will result in an additional actuation of the second stage valve in the same direction, the latter action being more rapid than that incident to the axial movement of the spindle 64 because of the restriction of passage 87a which retards the said axial movement.

With the close functional correspondence between the rotary mechanism and the reciprocating mechanism first described it will be seen that the operation of the rotary mechanism also is characterized by the smoothness of operation and freedom from vibration or hunting pointed out in connection with the reciprocating type of mechanism. Also, the rotary mechanism like that first described is sensitive and quickly responsive to changes of movement and speed of the input member of the system. In a word the general characterization of the reciprocating system appearing in the foregoing description thereof is largely applicable to the rotary type of mechanism.

As was stated at the outset, one of the objects of the present invention is to produce mechanism having the operational characteristics which have been referred to and which is also relatively accurate in the reproduction in the output element of the movements of the input elements of the system. This object is attained by both of the mechanisms which have been described. To indicate the improvement which has been effected in this regard, as well as in regard to smoothness of operation, attention is directed to Figs. 9 and 10 of the drawing which present operating charts representing, respectively, the present improved apparatus and prior two-stage apparatus lacking the novel differential connection between the stages. While Fig. 9 is generally applicable to both the reciprocating and rotary types of mechanism, for simplicity the description which follows will refer to the reciprocating type.

In Fig. 9 speed is plotted against time and the dotted line represents input speed while the full line indicates corresponding output speed. The dotted line represents a typical input motion, accelerating evenly to a speed which holds constant for a time and then decelerates evenly to a full stop. Referring to Fig. 1 in connection with Fig. 9, it will be seen that the valves 19 and 9 open at the beginning of the input movement, but that valve 19 has no immediate effect because of retardation while inertia of motor 15 is being overcome. Meanwhile, with the opening of valve 9 the inertia of the output motor 3 is being overcome and motor 3 starts with but slight delay. This action is shown at A. The output motor 3 then accelerates at a low rate to the point B. In the meantime valve 19 has been opening and accelerating motor 15 and causing valve 9 to open at a faster rate which in turn speeds up output motor 3. Thus motor 3 accelerates at an increased rate from B to C and, with the full added effect on valve 9, of the motor 15 movement, continues to accelerate at a still higher rate to the point D, where its speed equals that of the input. This reverses the relative motion of the follow-up connection 30 and the output valve 9 slows down in its opening movement and shortly afterward output motor 3, at point E, slows its rate of acceleration. In the meantime the valve 19 has reversed and closed, stopping motor 15 in a new position. This further slows the speed of valve 9 and the acceleration of motor 3, at the point F. At the point G valve 9 has stopped its opening movement and motor 3 is travelling at a constant speed proportional to the input speed, the input and output being in full motion.

Continuing, we may similarly trace the steps in deceleration to a full stop with input and output in new positions. When the input starts decelerating follow-up connection 30 first reverses valve 9 toward closed position. Deceleration of motor 3 is slightly delayed in relation to input, as shown at H. Then valve 19 reverses motor 15 which increases the speed of valve 9 toward closed position and output motor 3 decelerates at successively faster rates through points I and J to point K where the output speed again equals input speed. At the point L the relative motion of follow-up 30 slows the movement of valve 9, valve 19 reverses toward its neutral or closed position, which first slows motor 15 and valve 9 at the point M and finally closes valve 9 smoothly at N slightly after the stopping of the input.

It is to be understood that in the operation of the mechanism the various steps which have been traced merge in a smooth curve, the straight line sections having been shown to better indicate the predominant influence at any particular stage of the movement.

The chart of Fig. 9 brings out the fact that the errors or discrepancies between the speeds of input and output are confined substantially to the acceleration and deceleration periods and also the fact previously noted that the changes in the rates of acceleration and deceleration in the output are relatively gradual so that the apparatus in operation is not subjected to serious shock with resultant vibration and hunting. The truth of the last statement will be apparent from a comparison with Fig. 10 which illustrates the operation of the prior two-stage type of apparatus which may be considered as similar to the apparatus shown in Fig. 1 except that link 23 is omitted and the valve rod 12 of motor 9 is connected directly to the piston 17 of motor 15.

With the prior apparatus, motion of the input would obviously open old valve 19 without directly affecting old valve 9. Hence a considerable time elapses before old valve 9 begins to respond to the opening of old valve 19 and slightly longer before old motor 3 begins, at point O of the chart, to respond to the opening of old valve 9. The first movement of old motor 3 proceeds relatively rapidly from O to P where, with the inertia of old motor 3 partially overcome and old valve 9 more fully open the movement of old motor 3 proceeds at increasing rate to Q, where output speed equals input speed. At this point the old second stage follow-up 30 reverses but a considerable time elapses before the acceleration of old motor 3 can be slowed because old valve 19 must be stopped and old valve 9 slowed by old motor 15. This occurs at point R at a speed in excess of input speed. The result is a marked overshooting of the output speed at S; and this results in reversal of old valve 19, old motor 15 and old valve 9, which brings output speed back to the input speed at point T.

At this point it may be observed that the prior two-stage systems here in question are usually equipped with some form of damping device, such as a dashpot, to absorb the excess energy developed by over-acceleration between the points P and R on the chart. Furthermore it is apparent that the excess speed at S is capable of setting up an oscillation or hunting which may not be damped out for several cycles. Furthermore, if the inertia of the output member of the apparatus varies it is necessary to adjust the damping device to just absorb the excess energy and no more. It has been common to provide a needle valve with hand adjustment for this purpose. In the present apparatus no such adjustment is necessary because movement of the output is started sooner and has a longer time to accelerate the weight of the output which is therefore accomplished at a lower rate. In addition there is a feature of self-adjustment in the present improved apparatus. If the inertia of the output is great there will be a greater initial difference between the input and output movements and the first effect of opening valve 9 will be greater. On the chart of Fig. 9 this will cause the curve section AB to be both longer and steeper. Thus the system will handle any inertia load (dynamic), within the power put into it, in a smooth manner and free from hunting. This is particularly important where the load on the output motor varies widely.

Figure 10:
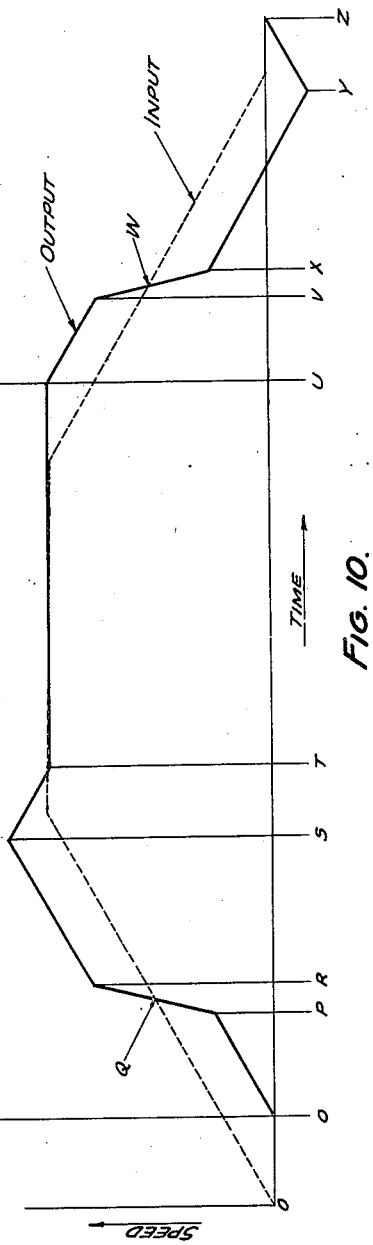
Fig. 10 is a chart showing a corresponding response curve typical of former amplifiers.

Returning to the chart of Fig. 10, it will be noted that following a period of constant speed deceleration occurs in a manner generally the reverse of the acceleration. It will be noted that at Y the speed of the output is not only at variance with input but is in the opposite direction. This accounts for the shock and chatter often found in such systems.

The input curves of Figs. 9 and 10 are arranged in vertical alignment to permit a comparison of the response delay of the output in the old and new systems, the delay as between points A and O and H and U of the two charts being specially marked. Furthermore, it is apparent from the two charts that the positional error of the output incident to the differences in speed of input and output is very substantially less in the new apparatus throughout the periods of acceleration and deceleration.

The advantages of the new system which have been pointed out are attained without in other respects sacrificing the response accuracy of the prior systems. For example, it will be apparent from the description of the apparatus of Fig. 1 that at all times, i. e., while running at fixed speed as well as during acceleration and deceleration, there is a certain positional error of output response incident to movement of the input that is necessarily absorbed by the devices between the input and the second stage valve. However, this is true to substantially the same degree with the prior two-stage systems which lacked the differential connection (link 28) between the first stage and the second stage valve.

In view of the functional similarity of the reciprocating and rotary systems which has been pointed out it will be clear without further description that the accuracy of response which has been pointed out more particularly in connection with the reciprocating form of apparatus is equally attained in the rotary type of apparatus. The latter type, furthermore, has marked advantages of compactness, possible high speed of operation and flexibility of application not possessed by reciprocating apparatus.

Preferred forms of construction have been disclosed but it is to be understood that the invention extends to various equivalent forms of construction within the bounds of the appended claims.

What is claimed is:

1. In two-stage follow-up type power amplifying apparatus operated by a flowing medium under pressure, the combination of first stage amplifying means comprising a pressure-medium motor, a pressure-medium control device operatively associated with said motor, secondary input means, and follow-up means operatively associated with said motor control device and secondary input means to cause the motor to travel proportionally to the travel of said secondary input means; second stage amplifying means comprising a second pressure-medium motor, a second pressure-medium control device operatively associated with the second motor, primary input means, and follow-up means operatively associated with said second motor, the primary input means and the secondary input means; and means constituting differential operating connections of both the first stage motor control device and the second stage motor control device between the first stage motor and the secondary input means, whereby the second motor is caused to travel and accelerate substantially in proportion to the primary input.

2. Apparatus as claimed in claim 1 in which the primary input means and the moving part of the second motor are constructed to reciprocate in the operation of the apparatus.

3. Apparatus as claimed in claim 1 in which the primary input means, the first motor and the control devices associated with the first and second motors are constructed to reciprocate in the operation of the apparatus.

4. Apparatus as claimed in claim 1 in which the primary input means and the control devices associated with the two motors are constructed to rotate in the operation of the apparatus.

5. In power amplifying apparatus operated by a flowing medium under pressure, the combination with input means and a fluid pressure operated output motor; of control mechanism for the said motor comprising a pair of cooperating valve members having mutual rotational and axial telescopic engagement and operatively connected one to the input means and the other to the output motor with ports in one of said members controllable by both relative rotational movement and relative axial telescoping movement of the two members; fluid actuated motor means for causing such relative axial movement of the two valve members; and valve means operable by the relative rotational movement of the two said valve members for controlling the last named motor means.

6. Apparatus as claimed in claim 1 in which means is provided to vary the amount of movement transmitted from the primary input means to the second control device for a given movement of the primary input means.

7. Apparatus as claimed in claim 5 in which the valve means for controlling the motor means that effects the relative telescoping movement of the two valve members comprises a plurality of alternatively usable valve elements which are constructed to cause a given movement of the input means to effect different amounts of the relative telescoping movement of the two valve members.

EDWARD M. MAY.

REFERENCES CITED

The following references are of record in the file of this patent:

UNITED STATES PATENTS

| Number | Name | Date |
| --- | --- | --- |
| 1,530,445 | Warren | Mar. 17, 1925 |
| 1,825,611 | Bangerter | Sept. 29, 1931 |
| 2,244,296 | Heinrich | June 3, 1941 |
| 2,344,547 | Halford | Mar. 21, 1944 |
| 2,349,641 | Tucker | May 23, 1944 |

Certificate of Correction

April 11, 1950

Patent No. 2,503,447     EDWARD M. MAY

It is hereby certified that errors appear in the printed specification of the above numbered patent requiring correction as follows:

Column 4, lines 63 and 64, strike out the sentence "All other elements of the system are in their original positions." and insert the same in line 49, same column, after "lever 30."; column 5, lines 41 and 42, strike out "and the valve 19 of the first stage" and insert the same after "stage" in line 40, same column; same line 40, for "of" before "the motor" read *to*;

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*